Nov. 12, 1957 W. NICHOLAS 2,812,810
PROJECTION SCREEN
Filed March 18, 1955 5 Sheets-Sheet 1
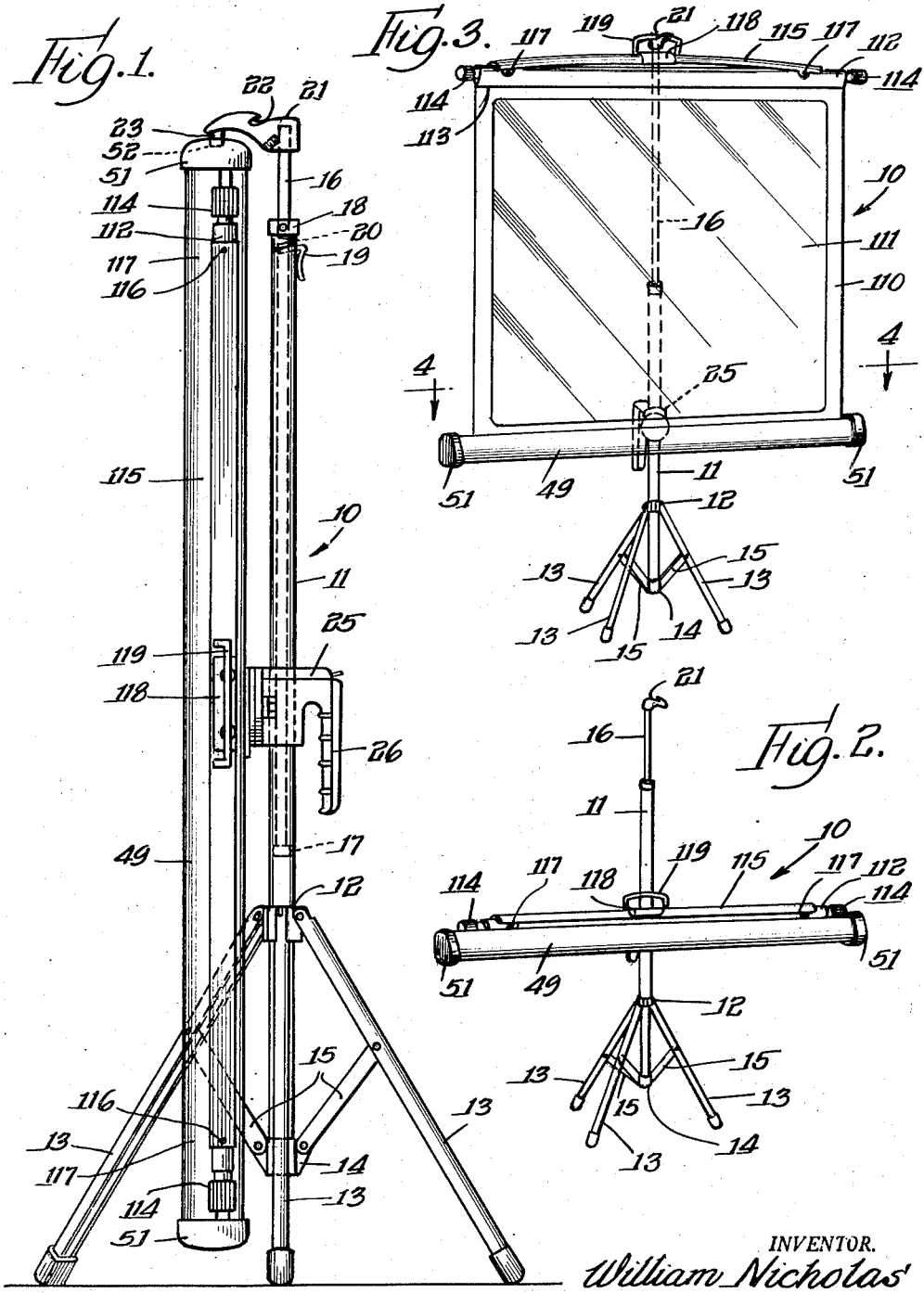
INVENTOR.
William Nicholas
BY

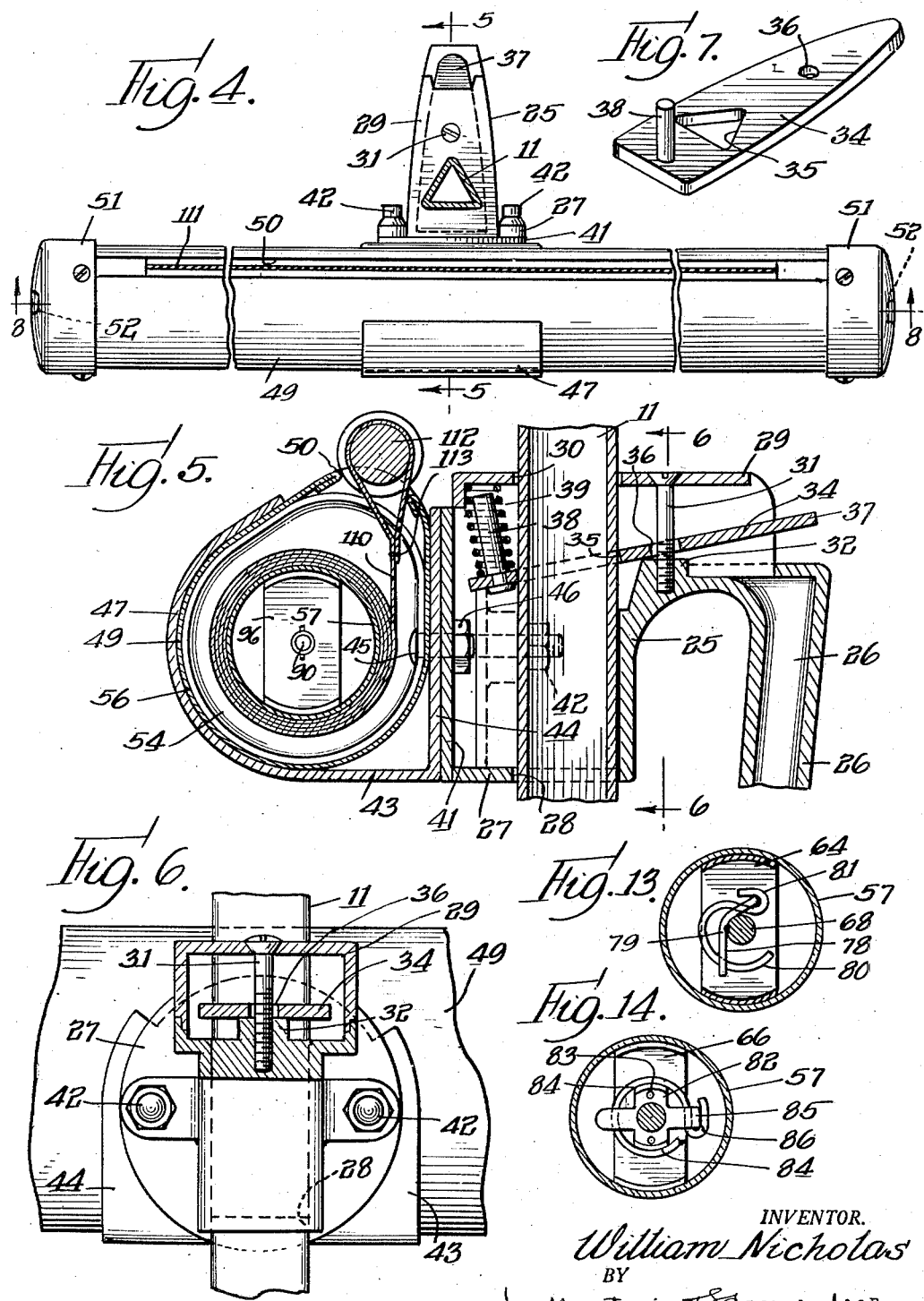

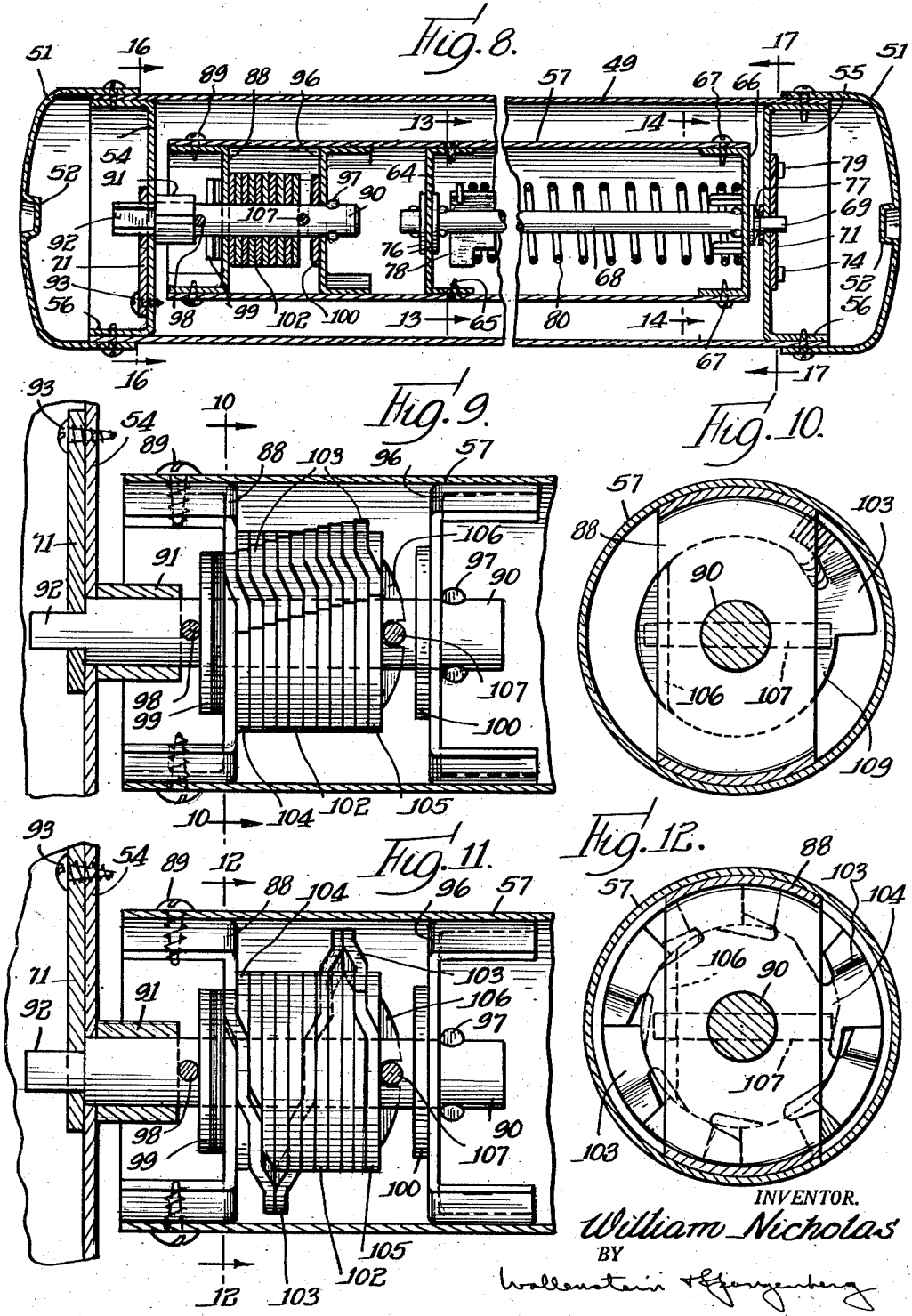

Nov. 12, 1957
W. NICHOLAS
2,812,810
PROJECTION SCREEN
Filed March 18, 1955
5 Sheets-Sheet 4
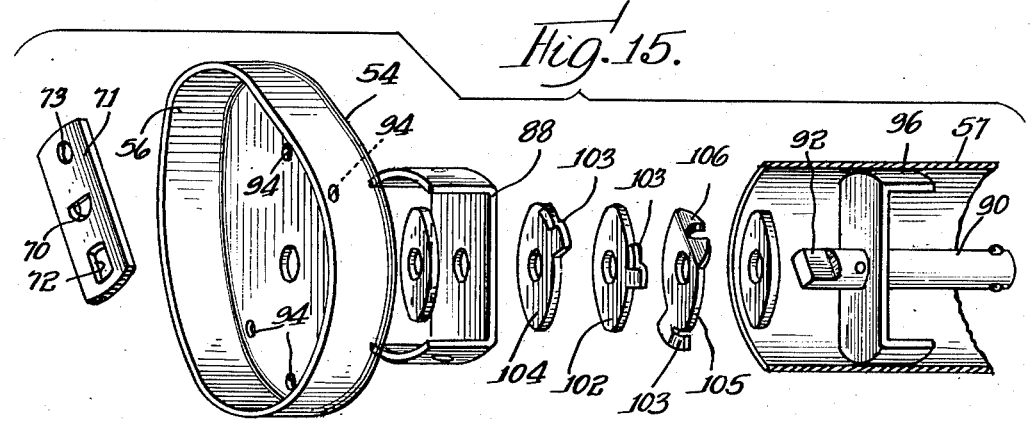
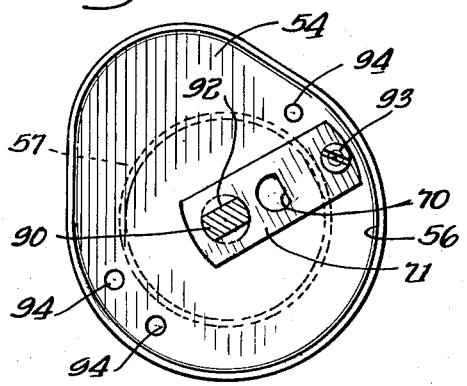
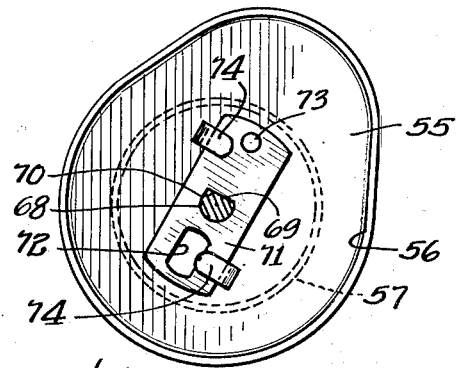
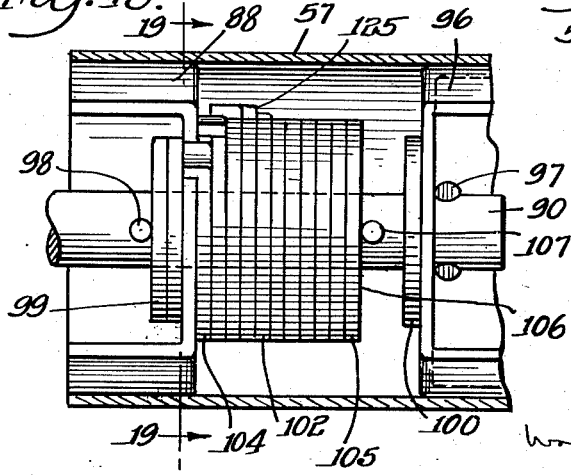
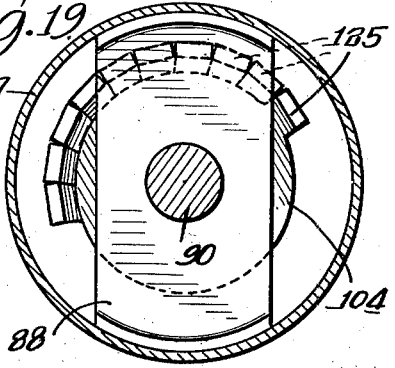
INVENTOR.
William Nicholas
BY
Wollenstein + Spangenberg
Attys

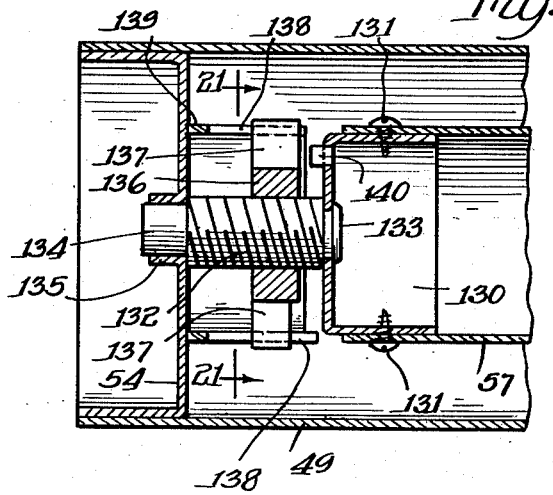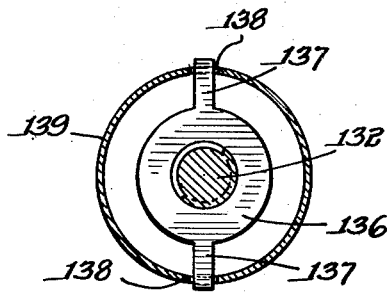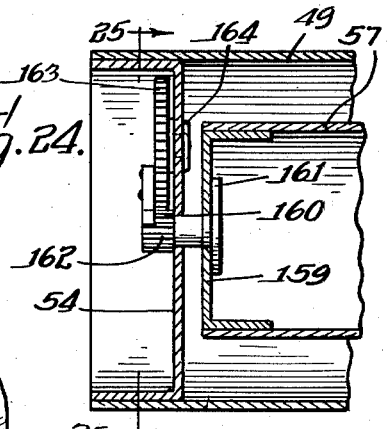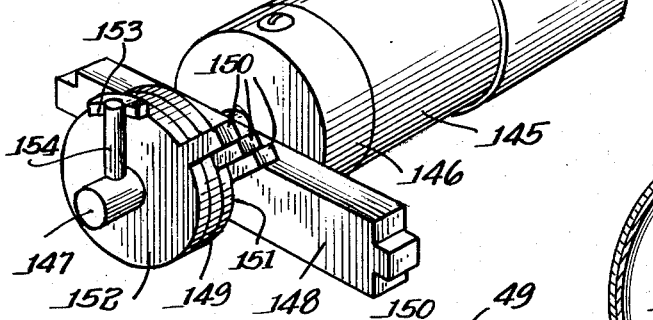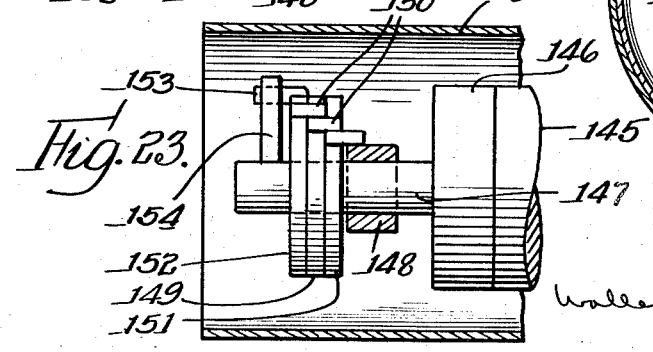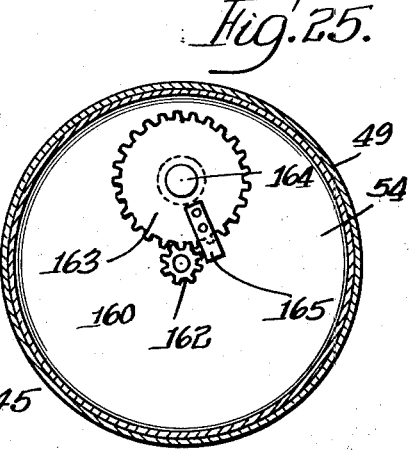

United States Patent Office 2,812,810
Patented Nov. 12, 1957

2,812,810

PROJECTION SCREEN

William Nicholas, Evanston, Ill., assignor to Radiant Manufacturing Corporation, Chicago, Ill., a corporation of Illinois Application March 18, 1955, Serial No. 495,090

8 Claims. (Cl. 160—24)

This invention relates to projection screens for using in exhibiting pictures projected thereon.

The principal object of this invention is to provide an improved projection screen which is particularly adaptable for use in exhibiting three dimensional pictures and wherein a flexible screen carried by a roller may be unrolled therefrom to picture exhibiting position, wherein unrolling of the screen is automatically stopped in picture exhibiting position, wherein complete unrolling of the screen from the roller is automatically prevented, wherein the screen is automatically tensioned in its picture exhibiting position to provide a substantially flat exhibiting surface for the projected three dimensional pictures, wherein distortion of the screen case which supports the screen roller is maintained at a minimum when the screen is tensioned, wherein scraping of the screen on the screen case is effectively prevented, and wherein the formation of ridges and the like in the screen is effectively eliminated.

Briefly, the projection screen of this invention may include a supporting stand having a post, a handle member carried by the post, a screen case carried by the handle member, a spring actuated roller mounted in the screen case, a flexible screen secured at one end to the roller and automatically rolled thereon and adapted to be unrolled therefrom to picture exhibiting position and having a suspension slat at its other end, and a hook member carried by the post for supporting the suspension slat to hold the screen in picture exhibiting position when the screen is unrolled from the roller. This structure thus far described is conventional and may be of any desired type. For example, the stand may be a collapsible stand having collapsible legs and having means for pivoting the screen case with respect to the stand.

In accordance with this invention, a stop means is connected between the screen case and the roller and it includes interengaging means for limiting the number of revolutions of the roller in the unrolling direction to automatically and positively stop the screen in picture exhibiting position and to prevent complete unrolling of the screen from the roller. The handle member, and hence the screen case, and the hook member, which receives the suspension slat, are adjustably mounted on the post for relative movement for the purpose of automatically tensioning the screen in picture exhibiting position against the positive stopping action of the stop means. To assist in the tensioning of the screen a resilient means is preferably interposed between the hook member and the suspension slat. In this way the screen is automatically tensioned in the picture exhibiting position to provide a substantially flat exhibiting surface which is particularly useful in exhibiting three dimensional pictures.

The screen case is also preferably tear drop shaped in cross dimension with the outwardly projecting portion thereof extending toward the picture exhibiting position, and this outwardly projecting portion has a screen accommodating slot which centrally receives the screen when it is being unrolled and which is engaged by the suspension slat when the screen is rolled on the roller. The outer end of the screen is secured to the suspension slat by looping the same over the suspension slat and stitching or heat sealing it in place. Because the suspension slat is stopped by the outwardly projecting portion of the screen case, the seam and/or stitching for securing the screen to the suspension slat cannot contact or engage the rolled screen in the screen case and, therefore, they are effectively prevented from impressing ridges or the like upon the screen. Also, the location of the screen accommodating slot in the outwardly projecting portion of the screen case, prevents the screen from scraping upon the edge of the slot as it is being rolled and unrolled, thereby preventing wear and tear and damage to the screen.

The ends of the screen case are also preferably rigidly secured to tear drop shaped end brackets, which rotatably support the screen roller, to provide a rigid structure so that when the screen is automatically tensioned in screen exhibiting position against the action of the stop means, distortion of the screen case with resultant ripples in the screen are eliminated or greatly minimized.

Further objects of this invention reside in the details of construction of the projection screen and in the cooperative relationships between the component parts thereof.

Other objects and advantages of this invention will become apparent to those skilled in the art upon reference to the accompanying specification, claims and drawings in which:

Fig. 1 is a side elevational view of the projection screen of this invention with the legs of the supporting stand extended and with the screen case vertically arranged.

Fig. 2 is a perspective view of the projection screen with the screen case horizontally located and with the screen contained within the screen case.

Fig. 3 is a view similar to Fig. 2 but illustrating the screen in picture exhibiting position.

Fig. 4 is a horizontal sectional view taken substantially along the line 4—4 of Fig. 3.

Fig. 5 is a vertical sectional view taken substantially along the line 5—5 of Fig. 4.

Fig. 6 is a vertical sectional view taken substantially along the line 6—6 of Fig. 5.

Fig. 7 is a perspective view of the nipping lever located in the handle member as illustrated in Fig. 5.

Fig. 8 is a vertical sectional view taken substantially along the line 8—8 of Fig. 4.

Fig. 9 is an enlarged vertical sectional view illustrating the left-hand portion of Fig. 8.

Fig. 10 is a vertical sectional view taken substantially along the line 10—10 of Fig. 9.

Fig. 11 is a vertical sectional view similar to Fig. 9 but showing the parts in different position.

Fig. 12 is a vertical sectional view taken substantially along the line 12—12 of Fig. 11.

Fig. 13 is a vertical sectional view taken substantially along the line 13—13 of Fig. 8.

Fig. 14 is a vertical sectional view taken substantially along the line 14—14 of Fig. 8.

Fig. 15 is an exploded perspective view of the parts illustrated in Fig. 9.

Fig. 16 is a vertical sectional view taken substantially along the line 16—16 of Fig. 8.

Fig. 17 is a vertical sectional view taken substantially along the line 17—17 of Fig. 8.

Fig. 18 is a vertical sectional view similar to Fig. 9, but illustrating another form of this invention.

Fig. 19 is a vertical sectional view taken substantially along the line 19—19 of Fig. 18.

Fig. 20 is a vertical sectional view similar to Fig. o but illustrating a further form of this invention.

Fig. 21 is a vertical sectional view taken substantially along the line 21—21 of Fig. 20.

Fig. 22 is a perspective view of still another form of this invention.

Fig. 23 is a vertical sectional view through the form of the invention illustrated in Fig. 22.

Fig. 24 is a vertical sectional view similar to Fig. 9, but illustrating still a further form of this invention.

Fig. 25 is a vertical sectional view taken substantially along the line 25—25 of Fig. 24.

Referring first to Figs. 1 to 3, the projection screen of this invention is generally designated at 10. It includes an upright tube which is generally triangular in cross section. A bracket 12 is slidably carried on the upright tube 11 and a plurality of legs 13 are pivotally secured to the bracket 12. Fixed to the bottom of the upright tube or post 11 is a bracket 14 and links 15 are pivotally secured to this bracket 14 and to the legs 13. The legs 13 may be folded together for transportation purposes and when this is done, the bracket 12 slides upwardly on the upright tube or post 11. Suitable latch means (not shown) are preferably provided for holding the leg 13 in collapsed position. When the legs 13 are extended for exhibiting purposes as illustrated in Figs. 1 to 3, the bracket 12 slides downwardly on the upright post 11. In this way, the supporting stand is maintained in an upright position.

An extension rod 16 is slidably mounted in the upright tube or post 11, the extension rod being guided for vertical movement by a collar 17 carried on the lower end of the extension rod and a cap 18 carried on the upper end of the post 11. The extension rod 16 is maintained in any desired extended position by a nipping lever 19 extending through a suitable opening in the upright tube or post 11 and gripping the extension rod 16. The nipping lever is resiliently urged into gripping position by means of a spring 20 and the action of this spring may be overcome by manually manipulating the nipping lever 19 to allow desired adjustment of the position of the extension rod 16. The upper end of the extension rod 16 carries a bracket 21 having a hook portion 22 and a knob 23. There is thus provided a hook member which is slidably and adjustably carried by the post.

A hollow handle member 25 having a handle portion 26 and a circular portion 27 is slidably carried on the upright tube or post 11. In this connection, it is provided with an opening 28 for receiving the post 11. The handle member 25 is also provided with a cover 29 which is provided with an opening 30 for receiving the post 11. The cover 29 is secured to the handle member 25 by a screw 31 screw-threaded into a boss 32 having a shoulder.

Located within the hollow handle member 25 is a nipping lever in the form of a plate 34 having an opening 35 conforming to and receiving the post 11. The plate 34 also has a hole 36 for accommodating the screw 31 and is provided at one end with an extension 37 forming a manipulating finger which extends outwardly from the hollow handle member 25. The other end of the plate 34 is provided with a spring seat 38 in the form of a post. The plate 34 is fulcrumed on one side on the shoulder 32 of the hollow handle member 25. Around the post 38 and extending between the cover 29 and the other side of the plate 34 is a compression spring 39. This compression spring 39 operates to tilt the plate 34 about the fulcrum 32 to cause the edges of the opening 35 in the plate 34 to engage and grip the opposite sides of the post 11. In this position, the nipping lever forcibly engages the post 11 and prevents relative motion therebetween in either direction. Movement of the handle member 25 upwardly with respect to the post 11 is prevented by the shoulder 32 engaging the nipping lever 34. It is noted that the post 38 extends in close proximity to the cover 29 and the post 38 and the cover 29 operate as a stop means. When the handle member 25 is pushed downwardly, the post 38 engages the cover member 29 and prevents further downward movement of the handle member 25. Thus, with the nipping lever 34 in the position shown in Fig. 5 upward and downward movement of the handle member 25 with respect to the post 11 is prevented. In other words, the handle member 25 is releasably locked to the post 11 against movement in either direction. When, however, the extension finger 37 of the nipping lever 34 is pressed downwardly, the nipping lever is fulcrumed about the shoulder 32 to release the edges of the opening 35 from the post 11. When this is done, the handle member 25 may be freely moved upwardly and downwardly along the post 11 to any desired position. When the nipping lever 34 is released, it automatically grips the post 11 and locks the handle member 25 in the adjusted position on the post 11.

A circular plate 41 is secured to the circular portion 27 of the handle member 25 by bolts and nuts 42. A bracket 43 having a flat leg 44 is pivotally mounted on the plate 41 by means of a bolt 45 and a nut 46. The bracket 43 is also provided with a curved leg 47 through which is secured, as by spot welding, a screen case 49 having a screen accommodating slot 50 therein. The bolt 45, in addition to extending through the bracket leg 44, also extends through the screen case 49 as illustrated in Fig. 5. A pair of closure caps 51 are removably secured to the ends of the screen case 49 and these caps are provided with recesses 52 which are adapted to receive the button 23 of the hook member when the screen case is arranged in vertical position as illustrated in Fig. 1. As shown in Figs. 2 and 3, the screen case 49 may be swung from its vertical position to its horizontal position, this being afforded by the pivotal connection between the screen case and the handle member 25.

The screen case 49 is preferably tear drop shaped in cross dimension with the outwardly projecting portion thereof, having the screen accommodating slot 50, extending toward the picture exhibiting position as is more clearly illustrated in Fig. 5. Located at each end of the screen case 49 are suporting brackets 54 and 55, these brackets also being tear drop shaped and being rigidly secured in the screen case 49 in reverse position with respect to the caps 51. In this respect the brackets 54 and 55 are provided with flanges 56, the flange 56 of the bracket 55 facing outwardly and being permanently secured to the screen case 49, as by welding, and the flange 55 of the bracket 54 facing outwardly and being removably secured to the screen case 49 as by screws or the like. These brackets 54 and 55, in addition to strengthening the screen case 49, are also utilized for rotatably supporting a roller 57 within the screen case. The roller 57 includes a substantially rigid one-piece metal tube so that it will not bend appreciably upon tensioning of the screen.

As shown more clearly in Figs. 8, 13, and 14 a bracket 64 is secured intermediate the ends of the roller 57 by means of screws 65. In a like manner, a bracket 66 is secured to the end of the roller 57 by screws 67. The brackets 64 and 66 are provided with holes for receiving a shaft 68 which shaft extends through a suitable hole in the supporting bracket 55 for supporting one end of the roller 57. The end of the shaft 68 is provided with a flat 69 which is received in a correspondingly shaped hole 70 in a securing member 71. This securing member 71 also has a rectangular shaped hole 72 adjacent one end and a hole 73 adjacent the other end. The member 71 gripping the shaft 68 may be rotated to wind a spring 80 about the shaft 68 to the desired extent. Thereafter the member 71 is positioned behind a pair of fingers 74 struck out from the bracket 55 to prevent rotation thereof and hence rotation of the shaft 68. A pair of washers 76 are located on each side of the bracket 64 and a pair of washers 77 are interposed between the bracket 66 and the supporting bracket 55. The shaft 68 is suitably upset or peened adjacent the brackets 64 and 66 to prevent longitudinal movement of the shaft 68 with respect to the brackets 64 and 66.

A clip 78 is secured to the shaft 68 adjacent the bracket 64 as by welding indicated at 79. This clip 78 is provided with a pair of holes for receiving one end of coil spring 80, the end of the coil spring 80 being bent over as indicated at 81 for securing that end of the coil spring to the clip 78. A clip 82 is secured to the bracket 66 as by welding indicated at 83. This clip 82 is provided with a pair of arms 84 for centering the other end of the coil spring 80. That end of the coil spring 80 is bent over an ear 85 on the clip 82 as indicated at 86 for the purpose of securing that end of the spring to the clip. Since one end of the spring 80 is secured to the stationary shaft 68 and the other end is secured to the roller 57 through the bracket 82, the spring when wound operates to rotate the roller 57 in one direction and yet permits rotation of the roller in the opposite direction.

A bracket 88 is removably secured by screws 89 to the other end of the roller 57. This bracket 88 is provided with a hole for receiving a shaft 90, the shaft 90 being mounted in a sleeve 91 carried by the supporting bracket 54. The outer end of the shaft 90 is provided with a pair of flats 92 which is received in the rectangular hole 72 of a member 71 as is more clearly shown in Fig. 16. A screw 93 extends through the hole 73 in the member 71 and is received in one of a plurality of tapped holes 94 in the supporting bracket 54. In this way, the member 71 and hence the shaft 90 are held against rotation and the angular position of the shaft 90 may be selected by properly selecting the tapped hole 94 for receiving the screw 93. Another bracket 96 carried by the shaft 90 is slidably mounted in the roller 57 and this bracket 96 acts as an inboard bearing for the shaft 90. The brackets 88 and 96 are held in desired position with respect to the shaft 90 by ears 97 on the shaft 90 and a pin 98 extending through the shaft 90. Washers 99 are interposed between the pin 98 and the bracket 88 and a washer 100 is associated with the bracket 96. In this way this end of the roller 57 is rotatably mounted on the stationary shaft 90 carried by the bracket 54.

Interposed between the brackets 88 and 96 are a plurality of disks 102 arranged in a stack. Each of these disks is provided with an offset finger 103, the outer end of the finger on each disk overlying the finger of the next adjacent disk. The finger 103 on the end disk 104 of the stack overlies the bracket 88 which is secured to the roller 57. The disk 105 at the other end of the stack of disks is provided with an offset portion 106 which in turn is provided with a slot for receiving a pin 107 carried by the shaft 90. This disk 105 is secured to the shaft 90 and hence to the screen case so that it is held against rotation while the other end disk 104 is secured to the bracket 88 and hence to the roller 57 for rotation with the roller.

When the roller 57 is in normal position, the position to which it is urged by the spring 80 and the position wherein the projection screen is rolled on the roller, the fingers 103 on the disks lie adjacent each other as illustrated in Figs. 9 and 10. When, however, the projection screen is unrolled from the roller 57 so as to rotate the roller against the action of the spring 80, the bracket 88 which engages the finger 103 of the end disk 104 rotates this disk through substantially 360° until it engages the finger of the next disk 102. As the roller 57 is thus rotated each disk is progressively picked up until all of the fingers 103 engage each other as illustrated in Figs. 11 and 12. When this occurs further rotation of the roller 57 in the unrolling direction is positively stopped. As shown herein by way of example, 11 disks have been utilized which results in the roller 57 making approximately nine revolutions in the unrolling direction before it is positively stopped by the disks forming the automatic stop means. By utilizing different numbers of disks varying numbers of revolutions of the roller 57 may be obtained before rotation of the roller 57 is positively and automatically stopped.

One end of a flexible screen 110 is suitably secured to the roller 57 by means of an adhesive or the like. Preferably this end of the screen 110 is scarfed so as to substantially blend into the periphery of the roller 57. By doing this, the end of the screen does not form a bump and the formation of ridges in the screen as it is rolled on the roller is prevented. The flexible projection screen 110 may be made out of any suitable material such as a suitable treated cloth and it may be provided with a suitable picture projection surface such as a reflective silvered surface 111. The other end of the flexible screen 110 is secured over a suspension slat 112 which may take the form of a rod or tube. In this connection this end of the projection screen 110 is looped over the suspension slat 112 and is stitched or heat sealed in place as indicated at 113 in Figs. 3 and 5. When the screen 110 is rolled on the roller 57 the suspension slat 112 engages the edges of the screen accommodating slot 50 in the outwardly projecting portion of the screen case 49 and, therefore, the suspension slat 112 is maintained at a considerable distance from the roller 57. In this way the seam 113 is prevented from engaging the screen rolled upon the roller 57 so that it will not impress ridges upon the rolled screen. It is also noted that the outwardly projecting portion of screen case 49 extends toward the picture exhibiting position of the screen and that the screen accommodating slot 50 is so located as to substantially centrally receive the projection screen 110. In other words, the screen accommodating slot 50 is substantially vertically arranged above the rear of the roller 57 so that as the projection screen 110 is withdrawn from the screen case 49 it does not scrape against the edges of the slot 50. This greatly reduces the wear and tear upon the screen and provides for silent operation.

The ends of the suspension slat 112 may be provided with the suitable knobs 114. The ends of a leaf spring member 115 are secured as by rivets 116 to a pair of clips which are in turn secured by rivets 117 to the suspension slat 112. The leaf spring member 115 may be in the form of a substantial semi-circle in cross section. A bracket 118 is suitably secured to the spring member 115 and this bracket 118 carries a bale 119. The bale 119 is utilized for unrolling the flexible screen from the roller out through the slat 50 in the screen case and is also utilized for holding the screen in picture exhibiting position by engaging over the hook member 21. By reason of this construction there is provided a resilient means for securing the suspension slat 112 to the hook member 21 for supporting the projection screen 110 in picture exhibiting position.

When the projection screen of this invention is to be utilized for exhibiting pictures, the hook member 21 is moved substantially to the desired position and clamped in that position by the nipping lever 19. The screen 110 is then withdrawn from the screen case 49 and the bale 119 is hooked over the hook member 21 so that the screen 110 assumes the approximate position as shown in Fig. 3. Unrolling of the screen beyond the picture exhibting position is automatically prevented by the stop means including the fingered disks 102 so that complete unrolling of the screen from the roller and damage to the screen and the fastened screen end are effectively prevented. To tension the screen in picture exhibiting position to provide a flat picture projection surface, all that is necessary is to relatively move the handle member 25 and the hook member 21. This may be accomplished in either two ways. The nipping lever 19 may be manipulated and the hook member 21 moved upwardly to the desired position, or the nipping lever 34 may be manipulated and the handle member 25 moved downwardly to the desired position. In so doing, the resilient means 115 is tensioned for the purpose of applying tension to the flexible screen 110 and after the desired amount of tension is applied thereto, the nipping levers 19 or 34 are released and the hook member 21 or handle member 25 are thereupon automatically locked in the desired position to maintain the desired tension on the projection screen. This is all made possible by reason of the stop means including the fingered disks 102 which positively and automatically stop the roller 57 against rotation in the unrolling direction when the screen 110 is withdrawn to picture exhibiting position.

By so tensioning the screen 110 it is maintained in a substantially flat condition which makes it particularly adaptable for exhibiting projected three-dimensional pictures. Since the roller 57 is a substantially rigid metal roller, it will not bend or bulge upon tensioning of the screen and this effectively eliminates wrinkles and so forth in the screen. Since the screen case 49 and the supporting brackets 54 and 55 rigidly secured thereto are non-circular in cross dimension, tear drop shaped as herein illustrated, distortion of the screen case 49 upon tensioning of the screen 110 is effectively prevented or minimized. This also operates to eliminate wrinkles and so forth in the tensioned screen. Further, since the screen 110 does not engage the edges of the screen accommodating slot 50 in the screen case 49, the formation of ridges and wrinkles in the screen is also prevented. When it is desired to lower the screen 110 all that is necessary is to first release the tension in the screen 110 and this can be done by manipulating either of the nipping levers 19 or 34. Then the bale 119 may be lifted from the extension hook 21 and the screen is automatically retracted into the screen case by the spring 80 rotating the roller 57 in the rolling direction. Since both the hook member 21 and the handle member 25 are adjustable in both directions with respect to the post 11, the position of the projection screen, in picture exhibiting position, with respect to the supporting stand may be adjusted at will.

The form of the invention illustrated in Figs. 18 and 19 is very much like that illustrated in Figs. 1 to 17 and like reference characters for like parts have been utilized. It differs from the other form of the invention in the shape of the fingers formed on the stack of disks 102. Here the fingers are laterally bent fingers 125 as distinguished from the curved offset fingers 103. However, the manner of operation is the same and a further description is not considered necessary. The fingers 125 do not nest as closely as the fingers 103 and, therefore, for a given number of disks 102 the screen may not be unrolled as far before it is automatically stopped thereby.

The form of the invention illustrated in Figs. 20 and 21 accomplishes substantially the same results as are accomplished by the forms of the invention illustrated in Figs. 1 to 19. Here, however, the stop means for automatically stopping rotation of the roller in the unrolling direction is quite different. Here the end of the roller 57 has a bracket 130 secured thereto by screws 131. A screw 132 is secured to the bracket 130 by staking indicated at 133 and the outer end of the screw 132 is provided with a cylindrical bearing surface 134 received in a bearing sleeve 135 carried by the supporting bracket 54. Thus the screw 132 which rotates with the roller 57 journals this end of the roller 57 for rotation in the screen case 49. A nut 136 is mounted on the screw 132 and it is provided with a pair of fins 137 which slide in slots 138 of a sleeve member 139 secured to the bracket 54. The fins 137 and slots 138 prevent rotation of the nut 136 but allow the nut 136 to move longitudinally along the screw 132 as the latter is rotated by the roller 57. When the projection screen is rolled on the roller 57 the nut 136 is arranged at the left hand end of the screw 132 as illustrated in Fig. 20. As the screen is unrolled from the roller 57, the roller 57 is rotated and the screw 132 causes the nut 136 to move toward the roller 57. When the screen is unrolled to picture exhibiting position, one of the fins 137 is engaged by a lug 140 carried by the bracket 130 to prevent further unrolling of the screen from the roller 57. In this way, the number of revolutions of the roller 57 in the unrolling direction is limited by and positively stopped by the nut 136 engaging the lug 140 on the roller 57.

The form of the invention illustrated in Figs. 22 and 23 also utilizes a plurality of fingered disks to limit the number of revolutions of the roller in the unrolling direction. Here the roller 145 which has the screen 110 secured thereto is provided with an end cap 146 which, in turn, has secured thereto a shaft 147. The shaft 147 is rotatably journaled in a bracket 148 carried by the screen case 49. A stack of disks 149 having offset fingers 150 is rotatably arranged on the shaft 147. The disk 151 at one end of the stack of disks has its offset finger 150 engaging the supporting bracket 148 and the disk 152 at the other end of the stack is provided with an ear 153 provided with a slot which receives a pin 154 carried by the rotating shaft 147. As shown in Fig. 22, the screen has been withdrawn to picture exhibiting position and further rotation of the roller 145 in the unrolling direction is prevented by engagement of the offset ears 150. When the screen is to be retracted into the screen case, the spring actuated roller 145 automatically rolls the screen thereon and rotation in the rolling direction is permitted by the offset fingers 150 progressively disengaging. While only three fingered disks have been illustrated for simplification, of course any number of disks may be utilized depending upon the amount of unrolling required. The essential difference between the form of the invention illustrated in Figs. 22 and 23 and the forms of the invention illustrated in Figs. 1 to 19 is that the fingered disks in Figs. 22 and 23 are located outside of the roller 145 while the fingered disks 102 in Figs. 1 to 19 are located inside of the roller 57.

For limiting the number of revolutions of the roller 57 in the unrolling direction, the form of the invention illustrated in Figs. 24 and 25 utilizes meshing gears in lieu of the arrangements described above. Here the end of the roller 57 is provided with a bracket 159 which has a shaft 160 secured thereto by a flange 161. The shaft 160 extends through the supporting bracket 54 and is journaled for rotation therein. The outer end of the shaft 160 carries a pinion 162 which meshes with a gear 163 rotatably mounted on the supporting bracket 54 as indicated at 164. The gear 163 carries a stop member 165, the normal position of which is illustrated in Fig. 25. When the projection screen is unrolled from the roller 57, the roller 57 rotates the pinion 162 which in turn rotates the gear 163 and when the screen is withdrawn to the picture exhibiting position the stop member 165 engages the pinion 162 to prevent further rotation of the pinion 162 and hence further rotation of the roller 57 in the unrolling direction. Instead of the stop member 165 engaging the pinion 162 it may engage a suitable lug carried by the bracket 54, either arrangement being satisfactory. Thus this form of the invention, as well as all of the other forms of the invention, operates to limit the number of revolutions of the roller in the unrolling direction and hence to automatically stop the screen in the picture exhibiting position.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. In a projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case and including interengaging means for limiting the number of revolutions of the roller in the unrolling direction to automatically and positively stop the screen in picture exhibiting position and to prevent complete unrolling of the screen from the roller, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

2. In the projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case for limiting the number of revolutions of the roller in the unwinding direction to automatically and positively stop the screen in picture exhibiting position and to prevent complete unrolling of the screen from the roller, said stop means including a shaft, a stack of adjacent disks rotatably mounted on the shaft, each disk having a finger adapted to engage the finger on the next adjacent disk, means for connecting the disk at one end of the stack to the screen case, and means for connecting the disk at the other end of the stack to the roller, said fingers on said disks engaging when the screen is unrolled to picture exhibiting position, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

3. In a projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case for limiting the number of revolutions of the roller in the unwinding direction to automatically and positively stop the screen in picture exhibiting position and to prevent complete unrolling of the screen from the roller, said stop means including, a shaft secured to the screen case, a stack of adjacent disks rotatably mounted on the shaft, each disk having a finger adapted to engage the finger on the next adjacent disk, means for connecting the disk at one end of the stack to the shaft, and means for connecting the disk at the other end of the stack to the roller, said fingers in said disks engaging when the screen is unrolled to picture exhibiting position, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

4. In a projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case for limiting the number of revolutions of the roller in the unwinding direction to automatically and positively stop the screen in picture exhibiting position and to prevent complete unrolling of the screen from the roller, said stop means including a shaft secured to the roller, a stack of adjacent disks rotatably mounted on the shaft, each disk having a finger adapted to engage the finger on the next adjacent disk, means for connecting the disk at one end of the stack to the shaft, and means for connecting the disk at the other end of the stack to the screen case, said fingers on said disks engaging when the screen is unrolled to picture exhibiting position, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

5. In a projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case for limiting the number of revolutions of the roller in the unwinding direction to automatically and positively stop the screen in picture exhibiting position and to prevent complete unrolling of the screen from the roller, said stop means including, a screw secured to the roller, a nut mounted on the screw, and means connecting the nut to the screen case to prevent rotation of the nut and to cause the nut to move along the screw as the roller is rotated, said nut engaging said roller when the screen is unrolled to picture exhibiting position to stop further rotation of the roller, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

6. In a projection screen for use in exhibiting pictures projected thereon and having a screen case, a supporting member, a spring actuated roller rotatably mounted in the screen case and a flexible screen having a suspension slat at one end and secured at its other end to the roller and automatically rolled thereon and adapted to be unrolled therefrom to picture exhibiting position, in combination therewith, stop means connected to the roller and the screen case for limiting the number of revolutions of the roller in the unwinding direction to automatically and positively stop the screen in picture exhibiting position and to prevent complete unrolling of the screen from the roller, said stop means including a pinion secured to the roller, a gear rotatably carried by the screen case and meshing with the pinion, and a stop member carried by the gear for stopping rotation of the roller when the screen is unrolled to picture exhibiting position, a hook member, means for connecting the suspension slat to the hook member when the screen is unrolled to picture exhibiting position and including resilient means for applying a greater tensioning force to the screen than can be applied by the spring actuated roller, and means for adjustably mounting the screen case and hook member on the supporting member for permitting movement of the screen case and hook member apart and releasably locking them against movement toward each other to tension the resilient means and hence the screen in picture exhibiting position against the action of the stop means.

7. In a projection screen for use in exhibiting pictures projected thereon and having a supporting stand including a post, a screen case carried by the post, a spring actuated roller rotatably mounted in the screen case, a flexible screen having a suspension slat at one end and secured at its other end to the roller and automatically rolled thereon and adapted to be unrolled therefrom to picture exhibiting position, and a hook member carried by the post, in combination therewith, means for releasably securing the suspension slat to the hook member when the screen is unrolled from the roller and extended to picture exhibiting position and including resilient means for applying a greater tensioning force to the screen than can be applied by the spring actuated roller, stop means connected between the roller and screen case and including interengaging means for limiting the number of revolutions of the roller in the unrolling direction to automatically and positively stop the screen in picture exhibiting position and to prevent complete unrolling of the screen from the roller, and means for permitting movement of the hook member and screen case apart and releasably locking them against movement toward each other for tensioning the resilient means to tension the screen in picture exhibiting position against the action of the stop means.

8. In a projection screen for use in exhibiting pictures projected thereon and having a screen case member, a spring actuated roller member rotatably mounted by the screen case member and a flexible screen having a suspension slat at one end and secured at its other end to the roller member and automatically rolled thereon and adapted to be unrolled therefrom to picture exhibiting position, in combination therewith, stop means connected to the roller member and the screen case member for limiting the number of revolutions of the roller member in the unwinding direction to automatically and positively stop the screen in picture exhibiting position and to prevent complete unrolling of the screen from the roller member, said stop means including, a screw secured to one of said members, a nut mounted on the screw, means connecting the nut to the other of said members to prevent rotation of the nut with respect thereto and to cause the nut to move along the shaft as the roller member is rotated, and means associated with said one of said members and engaged by said nut when the screen is unrolled to picture exhibiting position to stop further rotation of the roller member, a hook member, means for connecting the suspension slat to the hook member when the screen is unrolled to picture exhibiting position and including resilient means for applying greater tension to the screen than can be applied by the spring actuated roller member, a supporting member, and means for adjustably mounting the screen case member and the hook member on the supporting member for permitting movement of the screen case member and the hook member apart and releasably locking them against movement toward each other to tension the resilient means and hence the screen in picture exhibiting position against the action of the stop means.

References Cited in the file of this patent
UNITED STATES PATENTS

| | | |
|---|---|---|
| 1,786,512 | Whitworth | Dec. 30, 1930 |
| 1,981,444 | Wittel | Nov. 20, 1934 |
| 2,370,235 | Du Mais | Feb. 27, 1945 |
| 2,591,685 | Du Mais et al. | Apr. 8, 1952 |
| 2,696,249 | Prokop et al. | Dec. 7, 1954 |